A. C. STEWART.
CARBURETER.
APPLICATION FILED NOV. 25, 1907.
924,200.
Patented June 8, 1909.
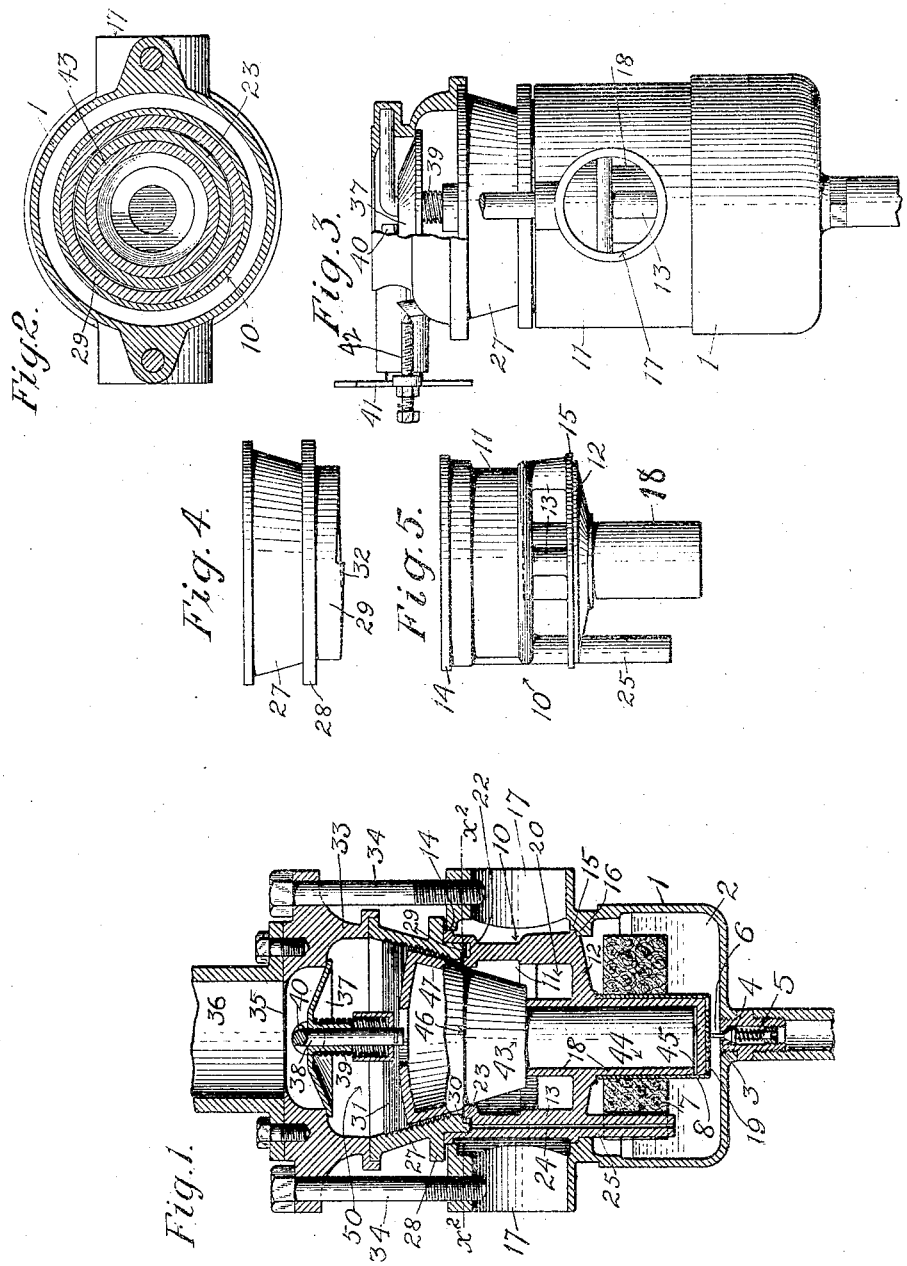

UNITED STATES PATENT OFFICE.

ALFRED C. STEWART, OF LOS ANGELES, CALIFORNIA.

CARBURETER.

No. 924,200.  Specification of Letters Patent.  Patented June 8, 1909.

Application filed November 25, 1907. Serial No. 403,812.

*To all whom it may concern:*

Be it known that I, ALFRED C. STEWART, a citizen of the United States, residing at Los Angeles, in the county of Los Angeles and State of California, have invented a new and useful Carbureter, of which the following is a specification.

An object of this invention is to provide a carbureter wherein the air supply and the oil supply will be properly proportioned at all times in the operation of the engine, during variations in speed.

Another object of the invention is to provide for flushing or supplying an excess of gasolene, when desired, in starting up the engine.

In the accompanying drawing:—Figure 1 is a vertical section of the carbureter. Fig. 2 is a section on line $x^2-x^2$ in Fig. 1. Fig. 3 is a side elevation. Fig. 4 is a detail elevation of a mixing chamber ring. Fig. 5 is a side elevation of the air chamber member.

The carbureter comprises a body 1, formed interiorly with an oil chamber 2 and the oil inlet 3 opening into the bottom thereof and provided with a valve 4, which is raised to closed position by a spring 5. Said valve has a stem 6, extending up into the chamber 2, and a float 7 in said chamber has a depending tube 8 whose lower end engages said stem to depress and open the valve when the oil level lowers.

A member 10, constituting an air chamber member, is adapted to seat in and on the body 1, said member 10 having an upper ring portion 11, and a lower disk portion 12, connected by posts 13. Ring portion 11 has an annular flange 14 fitting within the upper end of body 1 and disk 12 has an annular flange 15 seating on an annular flange 16 on the body 1. Disk 12 closes the top of oil chamber 2, the space 20 above this disk constituting an air chamber which communicates through the spaces between the posts 13, with the space within body 1 around the member 10. This latter space is in communication with the outer air through air inlets 17 in the wall of body 1. Disk 12 has a central tube 18 formed thereon and extending downwardly into oil chamber 2 and upwardly into the air chamber 20. The tube 18 serves as a guide for the float 7, the tube 8 of said float sliding on tube 18, and the bottom of tube 8 being perforated at 19 to permit passage of oil or gasolene. At the top of ring portion 11, member 10 has an annular groove 22, the inner wall 23 of which is lower than the outer wall and forms a lip over which the oil flows, said groove communicating with the oil supply through a duct 24 extending through one of the posts 17, and through an extension 25 thereof which extends down into the oil in chamber 2.

A ring 27 is seated on top of the member 10 by a flange 28 thereof, said ring forming a wall of the mixture chamber and having an annular flange 29, the lower end of said ring extending down into groove 22, leaving sufficient space below and inside of flange 29 to permit efflux of the oil or gasolene. A shoulder 30 on ring 27, within this flange 29, extends over the annular lip 23, so that an annular discharge slot is formed between the parts 30, 23 this slot forming an oil outlet discharging on to the top of lip 23. The bottom of annular flange 29 is inclined, as shown at 32, so that by turning ring 27 to different angular positions the depth of the space between the opening of oil duct 24 and the bottom of said flange is varied to vary the oil supply, this adjustment being made in setting up the carbureter for use. Ring 27 flares upwardly from its lower portion and the inner surface of said ring is corrugated as shown at 31. Said ring 27 constitutes a mixing chamber.

A top member 33 is seated over ring 27 and is held in place by screws 34 screwing into the body member 1. These screws serve also to clamp the mixture chamber wall or ring 27 in any angular position at which it may be adjusted. The member 33 forms the top of the mixture chamber whose wall is formed by the ring 27. This top member has a central outlet opening 35 for connection to the intake tube 36 of the engine, and a valve 37 is provided for this outlet, consisting of a disk, carried by a stem 38, fixed on the top member, and pressed upwardly, to closed position, by a spring 39. A cam 40 operated by lever 41 serves to depress the valve to open the outlet to the engine as may be required. A screw 42 on this lever engages with a fixed stop to limit the opening of the valve.

The valve member which serves to control the air supply and also to restrict the flow of mixture, comprises two upwardly flaring cone portions 43, 47 on a stem 44, which slides in the tube 18 aforesaid, acting as a plunger therein, this tube having a small opening 45 to permit slow passage of oil therethrough, thereby regulating the motion of the stem 44 in said tube, the latter acting as a dash pot. Above cone 43 this valve member has a shoulder 46 to seat on the lip 23 and acting as a cut off for the air, and above this shoulder the cone 47 which extends within the flaring ring 27. When the valve member is fully depressed, so that shoulder 46 thereof rests on valve seat or lip 23, the upper cone 47 is close to the ribs 31 on the flaring ring, but not in actual contact therewith.

The operation is as follows:—Valve 37 having been opened, and the engine being started in operation, the suction of the engine creates a condition of partial vacuum in the chamber 50 above the valve member 43, 47. Under ordinary conditions the suction will be sufficient to lift said valve member and to draw oil or gasolene through duct 24 and channel 22, the oil passing out at the annular slot between annular members 23, 30, and then meeting the current of air passing up over lip 23 and past cone 47. The valve member 43, 47 does not constrict the oil supply, the oil being free to flow out of the discharge slot in response to the suction thereat. The upward motion of the valve first unseats the shoulder 46 from lip 23 and opens up an annular passage between the cone 43 and the lip 23, and then on further movement of the valve, this annular passage is increased in area so that the air supply increases, on increased suction, due to higher speed of the engine. At the same time the space between the deflecting cone 47 and the ring 27 is increased in correspondence with the amount of suction and with the air supply, so that a fairly uniform velocity of the air through this space is secured and efficient mixture and absorption of the oil by the air is secured under all conditions of suction, even when the engine is running slow.

When the carbureter does not freely generate vapor, as in case of cold weather, the engine may not start up when "turned over" in the usual manner. Under such conditions, the operator will turn the engine over slowly so that the suction is insufficient to lift the valve 43, 47, but draws the gasolene from the oil chamber through the outlet above lip 23, so that the carbureter is "flushed" with gasolene, and then on turning the engine over more rapidly, a rich mixture is furnished, enabling the engine to start up.

The movement of the valve is controlled by the dash pot so that the effect of inertia of the said valve is minimized, and the valve moves smoothly and accurately to proper position, without danger of moving too far by reason of its momentum. To insure accurate operation of this dash pot, the gasolene is allowed access thereto, through the openings in tubes 8, 18. The float in the oil chamber maintains the gasolene at a uniform level, so that the rate of oil supply is in definite relation to the condition of suction at the oil outlet.

What I claim is:—

1. A carbureter comprising an air chamber formed with an annular lip, oil supply means having an annular oil outlet above and discharging on to said lip, a mixture chamber above said oil outlet, means for applying suction to the mixture chamber, and a valve member movable vertically within said chambers and having two portions respectively approaching the lip below the outlet and the wall of the mixture chamber above the outlet, in the descent of the valve member, to restrict the passage for air past the lip and the passage for air past and above the oil outlet, in correspondence, and said valve member formed with a shoulder between its said two portions, to seat on said lip.

2. A carbureter comprising an air chamber formed with an annular lip, oil supply means having an annular oil outlet above and discharging on to said lip, a mixture chamber above said oil outlet, means for applying suction to the mixture chamber, and a valve member movable vertically within said chambers and having two upwardly flaring portions respectively approaching the lip below the outlet and the wall of the mixture chamber above the outlet, in the descent of the valve member, to restrict the passage for air past the lip and past and above the oil outlet, in correspondence, said valve member having a shoulder between said two flaring portions, to seat on the lip when the valve member is fully depressed, and when the passage between the valve member and the wall of the mixture chamber is still open.

3. A carbureter comprising an air chamber formed with an annular lip, with an annular channel surrounding said lip, and with an oil duct communicating with said channel, an oil chamber communicating with said duct, a mixture chamber above the air chamber and movable to different angular positions relatively to the air chamber, means for securing the mixture chamber in any of such positions, said mixture chamber having its wall formed as a ring with a flange extending down into said channel and having its bottom inclined, to vary the flow from the oil duct according to the angular position of the said ring, and a vertically movable valve member coöperating with said lip to control the air admission.

4. A carbureter comprising a body formed with an oil chamber, a member seating on said body and closing the top of said oil chamber, the upper portion of said member forming an air chamber and provided with an annular lip around the air chamber, with a channel around the lip and with a duct extending down from said channel, into the oil chamber, a ring seated on the air chamber member and having a portion extending over said lip to form an annular oil outlet, a top member seated on said ring and forming therewith a mixture chamber, and formed with means for applying suction to the mixture chamber, means holding the top member toward the body to hold the parts in position, and a vertically movable valve member coöperating with said lip to control the air admission.

5. A carbureter comprising an oil chamber, an air chamber above the oil chamber, and formed with a lip, a mixture chamber above the air chamber, oil supply means communicating with the oil chamber and having an annular outlet above and discharging onto the said lip, a valve member movable vertically in said chambers, having portions coöperating with the said lip to vary the air supply and with the wall of the mixture chamber to restrict the passage for mixture, and a dash pot extending into the oil chamber and communicating therewith, and a plunger on the valve member extending in said dash pot.

In testimony whereof, I have hereunto set my hand at Los Angeles, California, this 11th day of November 1907.

ALFRED C. STEWART.

In presence of—
ARTHUR P. KNIGHT,
FRANK L. A. GRAHAM.